United States Patent
Yizze et al.

(10) Patent No.: US 12,304,414 B1
(45) Date of Patent: May 20, 2025

(54) VEHICLE INSTRUMENT PANEL AND FOLDABLE AIRBAG DEPLOYMENT DOOR

(71) Applicant: Ford Global Technologies, LLC, Dearborn, MI (US)

(72) Inventors: James Paul Yizze, Washington, MI (US); Victor A. Johnson, Royal Oak, MI (US); Jeffrey William DeMunnik, Ypsilanti, MI (US); Nicholas Andrew Mazzocchi, Ypsilanti, MI (US); Shane Scherbarth, Superior Township, MI (US); Alan Curtis Moran, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/619,409

(22) Filed: Mar. 28, 2024

(51) Int. Cl.
*B60R 21/205* (2011.01)
*B60R 21/215* (2011.01)
*B60R 21/2155* (2011.01)
*B60R 21/2165* (2011.01)

(52) U.S. Cl.
CPC ........ *B60R 21/205* (2013.01); *B60R 21/2155* (2013.01); *B60R 21/2165* (2013.01); *B60R 2021/21537* (2013.01)

(58) Field of Classification Search
CPC .............. B60R 21/205; B60R 21/2155; B60R 21/2165; B60R 2021/21537
See application file for complete search history.

(56) References Cited

U.S. PATENT DOCUMENTS

| | | | |
|---|---|---|---|
| 5,342,088 A | 8/1994 | Bauer | |
| 7,150,467 B2 * | 12/2006 | Bayer | B60R 21/2171 280/728.2 |
| 7,594,674 B1 * | 9/2009 | Biondo | B60R 21/2155 280/728.3 |
| 7,988,184 B2 * | 8/2011 | Fukawatase | B60R 21/205 280/728.3 |
| 8,840,141 B1 * | 9/2014 | Fischer | B60R 21/201 280/743.1 |
| 9,771,044 B1 * | 9/2017 | Patnala | B60R 21/2165 |
| 10,625,702 B2 | 4/2020 | Germain et al. | |
| 11,104,290 B2 * | 8/2021 | Vos | B60R 21/215 |
| 11,167,716 B2 * | 11/2021 | Tay | B60R 21/2165 |
| 11,505,157 B2 * | 11/2022 | Contraire | B60R 21/2165 |
| 2004/0164531 A1 * | 8/2004 | Riha | B29C 59/16 280/732 |
| 2007/0102903 A1 | 5/2007 | Kong | |

FOREIGN PATENT DOCUMENTS

CN 211969373 U 11/2020

* cited by examiner

*Primary Examiner* — Timothy Wilhelm
(74) *Attorney, Agent, or Firm* — Vichit Chea; Price Heneveld LLP

(57) ABSTRACT

An airbag deployment door for a motor vehicle, the airbag deployment door having a panel and a hinge formed along one side of the panel. The hinge is configured to couple to a panel on the vehicle to allow the panel to pivot, a tear seam extending on an opposite side of the panel, wherein the tear seam is configured to open during the deployment of an airbag, and a scoring line extending through the panel in the shape of a generally Y-shape to form first, second, and third panel members, wherein the scoring lines allow the first, second, and third panel members to fold during deployment of the airbag.

20 Claims, 2 Drawing Sheets

VEHICLE INSTRUMENT PANEL AND FOLDABLE AIRBAG DEPLOYMENT DOOR

FIELD OF THE DISCLOSURE

The present disclosure generally relates to motor vehicles equipped with airbags, and more particularly relates to a passenger airbag door generally integrated in the instrument panel of a motor vehicle.

BACKGROUND OF THE DISCLOSURE

Motor vehicles are commonly equipped with deployable passenger airbags. Airbags may be deployed from within a trim panel, such as the instrument panel. Typically, the airbag includes an airbag door that opens during airbag deployment and pivots along an edge about the trim panel during deployment. Different instrument panel styling themes or designs require different airbag door configurations. It is contemplated to provide for an airbag door configured to deploy proximate to a windshield in an efficient manner.

SUMMARY OF THE DISCLOSURE

According to a first aspect of the present disclosure, an airbag deployment door for a motor vehicle includes a panel including a hinge formed along one side of the panel to couple to a panel on the vehicle to allow the panel to pivot, and tear seam extending on an opposite side of the panel, wherein the tear seam is configured to open during the deployment of an airbag, and a scoring line extending through the panel in the shape of a generally Y-shape to form first, second, and third panel members, wherein the scoring lines allow the first, second, and third panel members to fold during deployment of the airbag.

Embodiments of the first aspect of the present disclosure can include any one or a combination of the following features:
- the airbag deployment door is configured to be coupled to an instrument panel in the motor vehicle;
- the scoring line comprises a reduced thickness of the panel;
- the tear seam comprises reduced thickness of an instrument panel;
- the first hinge comprises a reduced thickness material of the instrument panel;
- the airbag deployment door is for a passenger airbag located in front of a passenger seat in the motor vehicle; and
- the airbag door is located in an instrument panel vehicle rearward of a vehicle windshield, and wherein the airbag deployment door is configured to contact the windshield during deployment of the airbag.

According to a second aspect of the present disclosure, an instrument panel for a motor vehicle includes a top trim panel configured to be assembled onto the motor vehicle and an airbag deployment door includes a panel and a hinge formed along one side of the panel and the hinge is configured to couple to a panel on the vehicle to allow the panel to pivot and a tear seam extending on an opposite side of the panel. The tear seam is configured to open during the deployment of an airbag and a scoring line extends through the panel in the shape of a generally Y-shape to form first, second, and third panel members, wherein the scoring lines allow the first, second, and third panel members to fold during deployment of the airbag.

Embodiments of the second aspect of the present disclosure can include any one or a combination of the following features:
- the airbag deployment door is integrally formed with the instrument panel in the vehicle;
- the scoring line comprises a reduced thickness of the panel;
- the tear seam comprises reduced thickness of the instrument panel;
- the first hinge comprises a reduced thickness material of the instrument panel;
- the airbag deployment door is for a passenger airbag located in front of a passenger seat in a motor vehicle; and
- the instrument panel is vehicle rearward of a vehicle windshield, and wherein the airbag deployment door is configured to contact the windshield during deployment of the airbag.

Another aspect of the present disclosure is a vehicle and a windshield having an instrument panel located vehicle rearward and/or below the windshield and an airbag system. The airbag system includes an airbag and an airbag deployment door comprising a panel, a hinge coupling one side of the panel to the instrument panel and configured to allow the panel to pivot during deployment of the airbag, a tear seam extending on an opposite side of the panel, wherein the tear seam is configured to open during the deployment of an airbag, and including a scoring line extending through the panel in the shape of a generally Y-shape to form first, second, and third panel members, wherein the scoring lines allow the first, second, and third panel members to fold during deployment of the airbag.
- the airbag deployment door is integrally formed with the instrument panel;
- the scoring line comprises a reduced thickness of the panel;
- the tear seam comprises reduced thickness of the instrument panel; and
- the first hinge comprises a reduced thickness material of the instrument panel.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
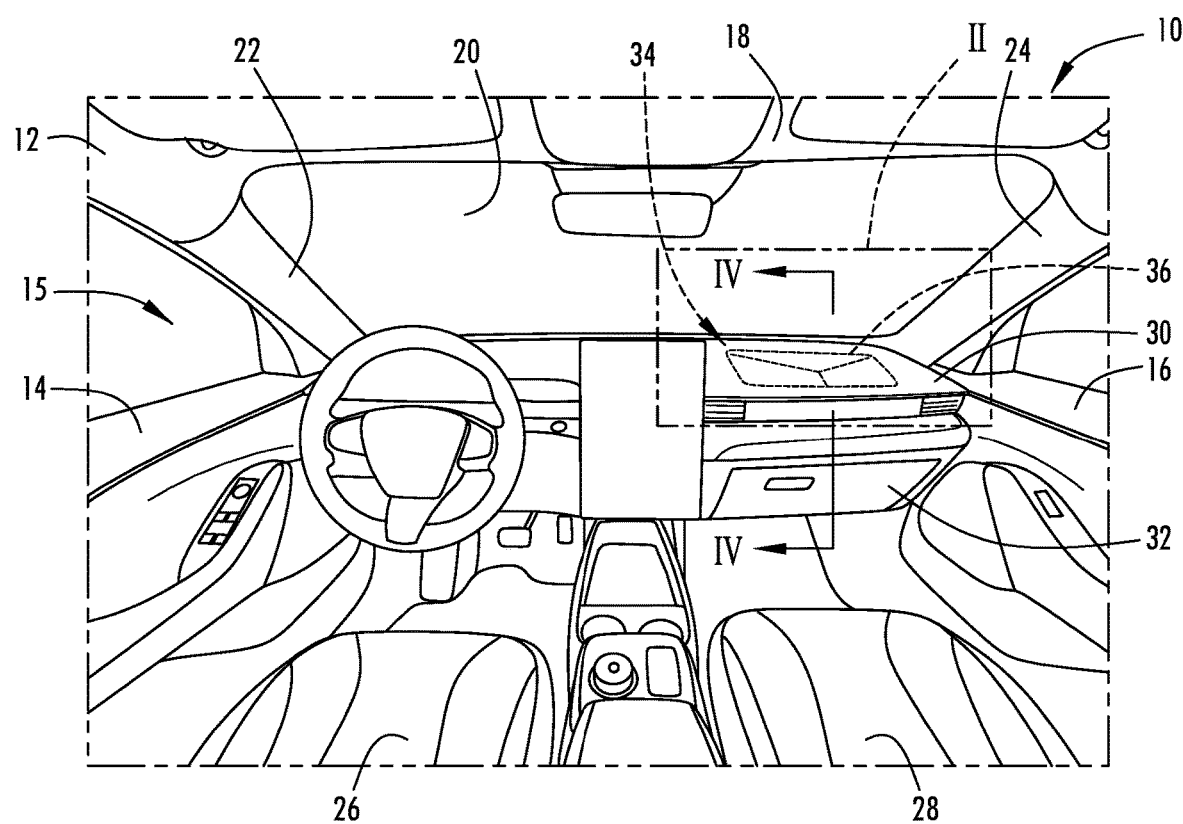
FIG. 1 is a forward-looking view of the cabin interior of a motor vehicle equipped with a passenger airbag system having an airbag deployment door, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle instrument panel and an airbag deployment door that deploys from the instrument panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10, such as a wheeled motor vehicle, is generally illustrated having a vehicle body 12 generally defining a cabin interior which is also referred to as a passenger compartment 15. The passenger compartment 15 typically includes an arrangement of passenger seating, including a front row of seating having a driver seat 26 on the left side and a passenger seat 28 on the right side. The driver seat 26 is located generally rearward of a steering wheel. A trim panel in the form of a dashboard, also referred to as an instrument panel 30, generally extends forward of the first row of seating and extends in front of the passenger seat 28 and may further extend in front of the driver seat 26.

The motor vehicle 10 is configured with the body 12 having a driver side door 14 and a passenger side door 16 that allow ingress and egress to the motor vehicle 10. The body 12 also includes a roof 18 and a windshield 20 that generally extends between left and right support pillars 22 and 24 and between the instrument panel 30 on the lower side and the roof 18 on the upper side. The windshield 20 is typically made of a laminated glass and provides a relatively large viewing area across the front end of the passenger compartment 15.

The motor vehicle 10 is further shown equipped with an airbag system 34 configured as a passenger airbag system shown in one example located in the instrument panel 30 on the right passenger side generally vehicle forward of the passenger seat 28. The vehicle 10 typically includes additional airbag systems for the driver and other passengers. The airbag system 34 is generally integrated into the instrument panel 30 on the right passenger side of the vehicle 10. The airbag system 34 typically includes an inflatable airbag that inflates with a gas generated during deployment. The airbag system 34 has an airbag deployment door 36 which, prior to deployment, is shown extending flush across a portion of the instrument panel 30. Upon deployment of the airbag, the airbag deployment door 36 opens to allow the inflation and release of the airbag.

Figure 2:
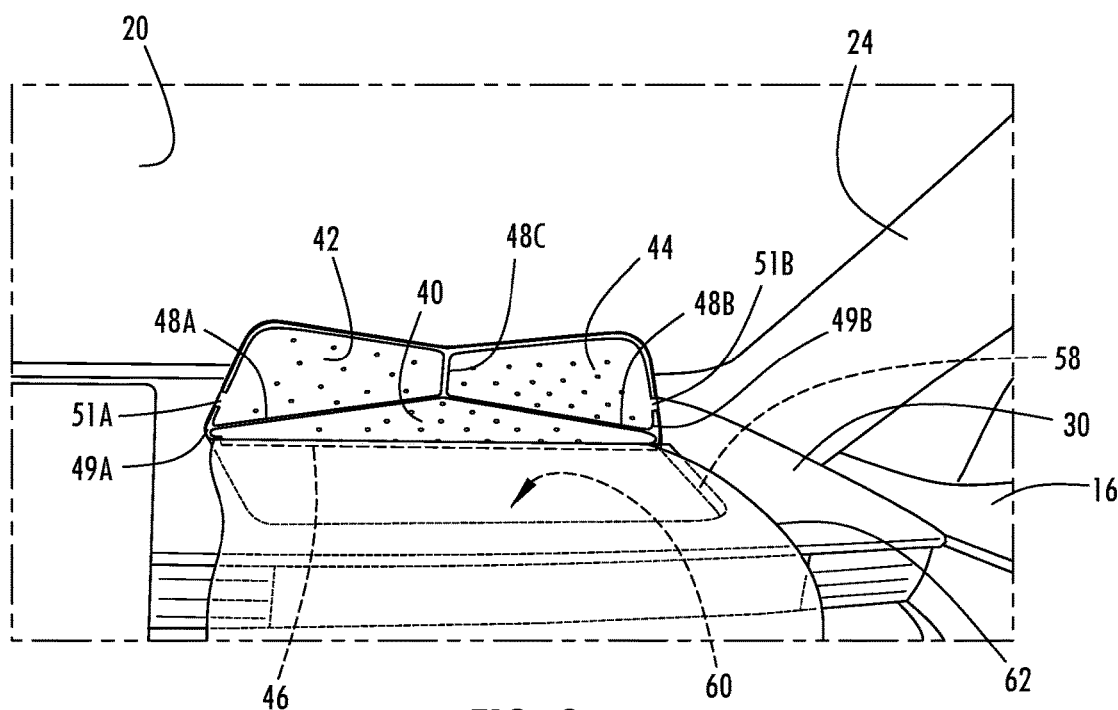
FIG. 2 is an enlarged view of Section II of FIG. 1 showing the airbag deployment door in a deployed open position following deployment of the airbag.

Referring to FIG. 2, the airbag deployment door 36 is shown in an open fully deployed or inflated position following the deployment of the airbag system 34. As illustrated, the airbag deployment door 36 is generally formed of a panel, integrally as part of a trim panel, particularly as part of the instrument panel 30 that is scored with reduced thickness portions 48A, 48B, and 48C on a Y-shaped scoring line 48. The scoring line 48 defines three distinct panels, namely, a first panel 40, a second panel 42, and a third panel 44. The scoring line 48 serves as weakened fold lines that extend generally in the shape of a Y with portion 48C forming a base leg and portions 48A and 48B forming arms that extend to the lateral corners. During deployment, the scoring line 48 allows the first, second, and third panels 40, 42 and 44 to rotate and fold about the airbag during deployment to slow down the speed of movement of the airbag deployment door 36 and to reduce the contacting force of the airbag deployment door 36 with the windshield 20.

Figure 3:
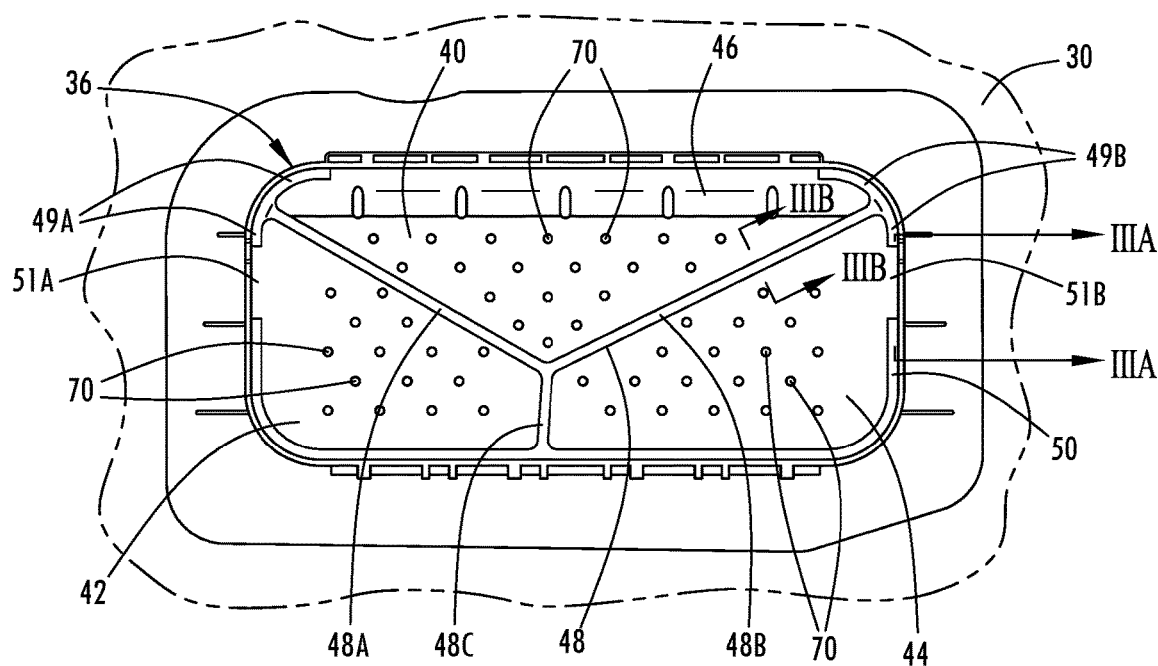
FIG. 3 is a top view of the instrument panel and the airbag deployment door in a non-deployed position.

Referring to FIG. 3, the airbag deployment door 36 is further illustrated having a first hinge 46 formed along a vehicle forward side of the airbag deployment door 36 and connected along an edge to the instrument panel 30. The first hinge 46 may include a thin line of reduced thickness material that forms a living hinge, for example. The living hinge 46 may include an angled downward portion that bends to rotate upwards during deployment to allow the airbag deployment door 36 to swing upward and vehicle forward. The vehicle rearward side of the airbag door 36 has a reduced thickness scoring line 50 which is sufficiently thin in thickness and designed to open from the instrument panel 30 upon deployment of the airbag. As such, the vehicle rearward portion of the airbag door 36 opens and pivots vehicle forward towards the windshield 20 about the first hinge 46 during deployment of the airbag. In doing so, the scoring line 48 allows each of the first, second, and third panels 40, 42, and 44 to flex and fold about the airbag as the airbag is being released. It should be appreciated that the airbag deployment door 36 may be integrally formed as a portion of the instrument panel 30.

Figure 3A:
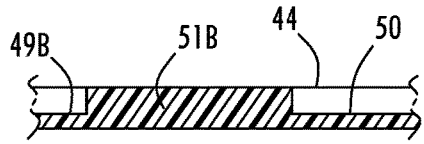
FIG. 3A is a cross-sectional view of the airbag deployment door taken through line IIIA-IIIA of FIG. 3.
Figure 3B:
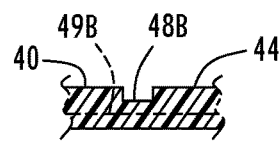
FIG. 3B is a cross-sectional view of the airbag deployment door taken through line IIIB-IIIB of FIG. 3.

The airbag deployment door 36 has reduced thickness portions 49A and 49B extending between the first hinge 46 on opposite ends and thick portions 51A and 51B of the instrument panel 30 which are further illustrated in FIG. 3A. The reduced thickness portions 49A and 49B are arcuate and allow the airbag deployment door 36 to rotate and open along the reduced thickness portions 49A and 49B during airbag deployment. The thick portions 51A and 51B may have the same thickness as the instrument panel 30 and operate to slow the rotating movement of the airbag deployment door 36 during deployment. The scoring lines may have a reduced thickness as illustrated by scoring line 48B in FIG. 3B. The reduced thickness may be 50%-70% of the thickness of the instrument panel 30, according to one example.

Each of the first, second, and third panels 40, 42, and 44 of the airbag deployment door 36 are further illustrated having a plurality of perforations 70 formed therein. The perforations 70 may include circular holes that extend at least partially into or entirely through the airbag deployment door 36. The perforations 70 allow for reduced weight of the first, second and third panels 40, 42 and 44, and hence reduced overall weight of the airbag deployment door 36. It should be appreciated that any of a number of a plurality of perforations of various sizes and shapes may be formed in each of the first, second, and third panels, 40, 42, and 44, respectively to reduce weight.

Figure 4:
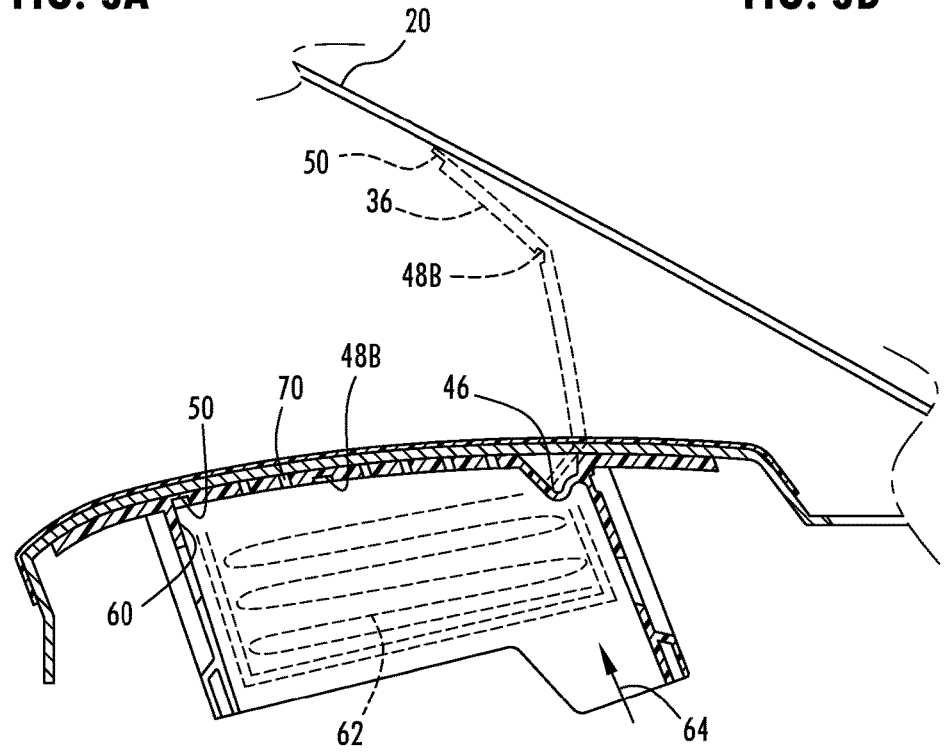
FIG. 4 is a cross-sectional view of the passenger airbag system taken through lines IV-IV of FIG. 1 and showing the airbag deployment door in a folded open position.

Referring to FIG. 4, the airbag system is further shown in relation to a deployed airbag deployment door 36 relative to the windshield 20. The airbag system includes an airbag 62 shown stowed within an airbag chute 60. A pressurized gas is generated and released during airbag deployment to inflate and force the airbag upwards in the airbag chute 60 into contact with the airbag deployment door 36. The force of the inflating airbag on the airbag deployment door 36 causes the airbag deployment door 36 to open about the vehicle rearward tear seam 50 and pivot upward and vehicle forward about the first hinge 46 to a position as shown by the dashed lines contacting the interior side of the windshield 20 in FIG. 4. The scoring line 48 with reduced thickness portions 48A, 48B and 48C advantageously allow the airbag deployment door 36 to rotate and fold during deployment and thereby reduces or minimizes the force transferred to the windshield 20.

Accordingly, the motor vehicle 10 is equipped with an instrument panel 30 having an airbag deployment door 36 configured with at least three panels 40, 42, and 44 interconnected with a Y-shaped scoring line 48 and coupled to the instrument panel 30 via a first hinge 46. The scoring lines advantageously allow the three panels 40, 42 and 44 to rotate and fold and thereby reduces the force of the airbag deployment door 36 that is applied to the windshield 20 during deployment of the airbag.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An airbag deployment door for a motor vehicle, the airbag deployment door comprising:
   a panel;
   a hinge formed along one side of the panel, the hinge configured to couple to a panel on the vehicle to allow the panel to pivot;
   a tear seam extending on an opposite side of the panel, wherein the tear seam is configured to open during the deployment of an airbag; and
   a scoring line extending through the panel in the shape of a generally Y-shape to form first, second, and third panel members, wherein the scoring lines allow the first, second, and third panel members to fold along the scoring lines during deployment of the airbag.

2. The airbag deployment door of claim 1, wherein the airbag deployment door is configured to be coupled to an instrument panel in the motor vehicle.

3. The airbag deployment door of claim 1, wherein the scoring line comprises a reduced thickness of the panel.

4. The airbag deployment door of claim 1, wherein the tear seam comprises reduced thickness of an instrument panel.

5. The airbag deployment door of claim 4, wherein the first hinge comprises a reduced thickness material of the instrument panel.

6. The airbag deployment door of claim 1, wherein the airbag deployment door is for a passenger airbag located in front of a passenger seat in the motor vehicle.

7. The airbag deployment door of claim 1, wherein the airbag door is located in an instrument panel vehicle rearward of a vehicle windshield, and wherein the airbag deployment door is configured to contact the windshield during deployment of the airbag.

8. An instrument panel for a motor vehicle, the instrument panel comprising:
- a top trim panel configured to be assembled onto the motor vehicle; and
- an airbag deployment door comprising:
  - a panel;
  - a hinge formed along one side of the panel, the hinge configured to couple to a panel on the vehicle to allow the panel to pivot;
  - a tear seam extending on an opposite side of the panel, wherein the tear seam is configured to open during the deployment of an airbag; and
  - a scoring line extending through the panel in the shape of a generally Y-shape to form first, second, and third panel members, wherein the scoring lines allow the first, second, and third panel members to fold along the scoring lines during deployment of the airbag.

9. The instrument panel of claim 1, wherein the airbag deployment door integrally formed with the instrument panel in the vehicle.

10. The instrument panel of claim 1, wherein the scoring line comprises a reduced thickness of the panel.

11. The instrument panel of claim 1, wherein the tear seam comprises reduced thickness of the instrument panel.

12. The instrument panel of claim 1, wherein the first hinge comprises a reduced thickness material of the instrument panel.

13. The instrument panel of claim 1, wherein the airbag deployment door is for a passenger airbag door located in front of a passenger seat in a motor vehicle.

14. The instrument panel of claim 1, wherein the instrument panel is vehicle rearward of a vehicle windshield, and wherein the airbag deployment door is configured to contact the windshield during deployment of the airbag.

15. A vehicle comprising:
- a windshield;
- an instrument panel located vehicle rearward and/or below the windshield; and
- an airbag system, the airbag system comprising:
  - an airbag; and
  - an airbag deployment door comprising:
    - a panel;
    - a hinge coupling one side of the panel to the instrument panel, the hinge configured to allow the panel to pivot during deployment of the airbag;
    - a tear seam extending on an opposite side of the panel, wherein the tear seam is configured to open during the deployment of an airbag; and
    - a scoring line extending through the panel in the shape of a generally Y-shape to form first, second, and third panel members, wherein the scoring lines allow the first, second, and third panel members to fold along the scoring lines during deployment of the airbag.

16. The vehicle of claim 1, wherein the airbag deployment door is integrally formed with the instrument panel.

17. The vehicle of claim 1, wherein the scoring line comprises a reduced thickness of the panel.

18. The vehicle of claim 1, wherein the tear seam comprises reduced thickness of the instrument panel.

19. The vehicle of claim 1, wherein the first hinge comprises a reduced thickness material of the instrument panel.

20. The vehicle of claim 1, wherein the airbag deployment door is for a passenger airbag door located in front of a passenger seat in the vehicle.

* * * * *